United States Patent
Gupta et al.

(10) Patent No.: US 9,678,686 B2
(45) Date of Patent: *Jun. 13, 2017

(54) MANAGING SEQUENTIALITY OF TRACKS FOR ASYNCHRONOUS PPRC TRACKS ON SECONDARY

(71) Applicant: INTERNATIONAL BUSINESS MACHINES CORPORATION, Armonk, NY (US)

(72) Inventors: Lokesh M. Gupta, Tucson, AZ (US); Theodore T. Harris, Jr., Tucson, AZ (US); Gail A. Spear, Tucson, AZ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/175,484

(22) Filed: Jun. 7, 2016

(65) Prior Publication Data

US 2016/0283130 A1    Sep. 29, 2016

Related U.S. Application Data

(63) Continuation of application No. 14/207,234, filed on Mar. 12, 2014, now Pat. No. 9,396,121.

(51) Int. Cl.
| | |
|---|---|
| *G06F 3/06* | (2006.01) |
| *G06F 12/0868* | (2016.01) |
| *G06F 11/10* | (2006.01) |
| *G06F 12/0813* | (2016.01) |
| *H04L 29/08* | (2006.01) |
| *G06F 11/14* | (2006.01) |
| *G06F 12/0804* | (2016.01) |

(52) U.S. Cl.
CPC .............. *G06F 3/065* (2013.01); *G06F 3/067* (2013.01); *G06F 3/0608* (2013.01); *G06F 3/0619* (2013.01); *G06F 3/0647* (2013.01); *G06F 3/0655* (2013.01); *G06F 3/0689* (2013.01); *G06F 11/1076* (2013.01); *G06F 11/14* (2013.01); *G06F 12/0813* (2013.01); *G06F 12/0868* (2013.01); *H04L 67/104* (2013.01); *H04L 67/1095* (2013.01); *H04L 67/1097* (2013.01); *G06F 12/0804* (2013.01); *G06F 2212/1016* (2013.01); *G06F 2212/154* (2013.01); *G06F 2212/262* (2013.01); *G06F 2212/286* (2013.01); *G06F 2212/312* (2013.01); *G06F 2212/60* (2013.01); *G06F 2212/6042* (2013.01); *G06F 2212/62* (2013.01); *G06F 2212/621* (2013.01)

(58) Field of Classification Search
None
See application file for complete search history.

(56) References Cited

U.S. PATENT DOCUMENTS

| | | |
|---|---|---|
| 5,555,371 A | 9/1996 | Duyanovich et al. |
| 2003/0200387 A1 | 10/2003 | Urabe et al. |
| 2007/0067593 A1 | 3/2007 | Satoyama et al. |
| 2011/0208694 A1 | 8/2011 | Bitar et al. |
| 2013/0024628 A1 | 1/2013 | Benhase et al. |

*Primary Examiner* — Baboucarr Faal
(74) *Attorney, Agent, or Firm* — Griffiths & Seaton PLLC

(57) ABSTRACT

For performing efficient management of tracks in an asynchronous Peer-to-Peer Redundant Copy (PPRC) operation in a computing storage environment, a correct status of a sequential bit is determined by examining a primary cache, where if data being transferred pursuant to the PPRC operation in a primary track remains in the primary cache, the sequential bit setting found therein is used.

18 Claims, 4 Drawing Sheets

MANAGING SEQUENTIALITY OF TRACKS FOR ASYNCHRONOUS PPRC TRACKS ON SECONDARY

CROSS REFERENCE TO RELATED APPLICATIONS

This application is a Continuation of U.S. patent application Ser. No. 14/207,234, filed on Mar. 12, 2014.

BACKGROUND OF THE INVENTION

Field of the Invention

The present invention relates in general computing systems, and more particularly to, systems and methods for efficient management of sequentiality of tracks for asynchronous PPRC operations in a computing storage environment.

Description of the Related Art

In today's society, computer systems are commonplace. Computer systems may be found in the workplace, at home, or at school. Computer systems may include data storage systems, or disk storage systems, to process and store data. Contemporary computer storage systems are known to destage storage tracks from cache to long-term storage devices so that there is sufficient room in the cache for data to be written. When destaging the storage tracks, contemporary storage systems destage the storage tracks from each rank in the cache when the cache is becoming full or the global pressure factor is high. That is, storage tracks are destaged from each rank when the global pressure factor is high, even though some ranks in the cache may only be storing a small number of storage tracks with respect to the amount of storage space allocated to these ranks. Moreover, destaging tasks assist with starting the destaging of storage tracks to the storage systems. Also, disasters caused by environmental conditions, user errors, or application errors may occur in which access to the data is lost for some period of time. Mirroring or copying data to a secondary storage system from a primary storage system is currently employed to minimize the time in which access to data is lost due to a disaster. Efficiently destaging, storing, and/or mirroring data to a secondary storage system from a primary storage system is a key problem to solve, and therefore, a need exists to improve the destaging, storage, and management of data in a data storage system.

SUMMARY OF THE INVENTION

In one embodiment by way of example only, a method is provided for performing efficient management of tracks in an asynchronous Peer-to-Peer Redundant Copy (PPRC) operation in a computing storage environment. A correct status of a sequential bit is determined by examining a primary cache, where if data being transferred pursuant to the PPRC operation in a primary track remains in the primary cache, the sequential bit setting found therein is used.

In addition to the foregoing exemplary method embodiment, other exemplary system and computer product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
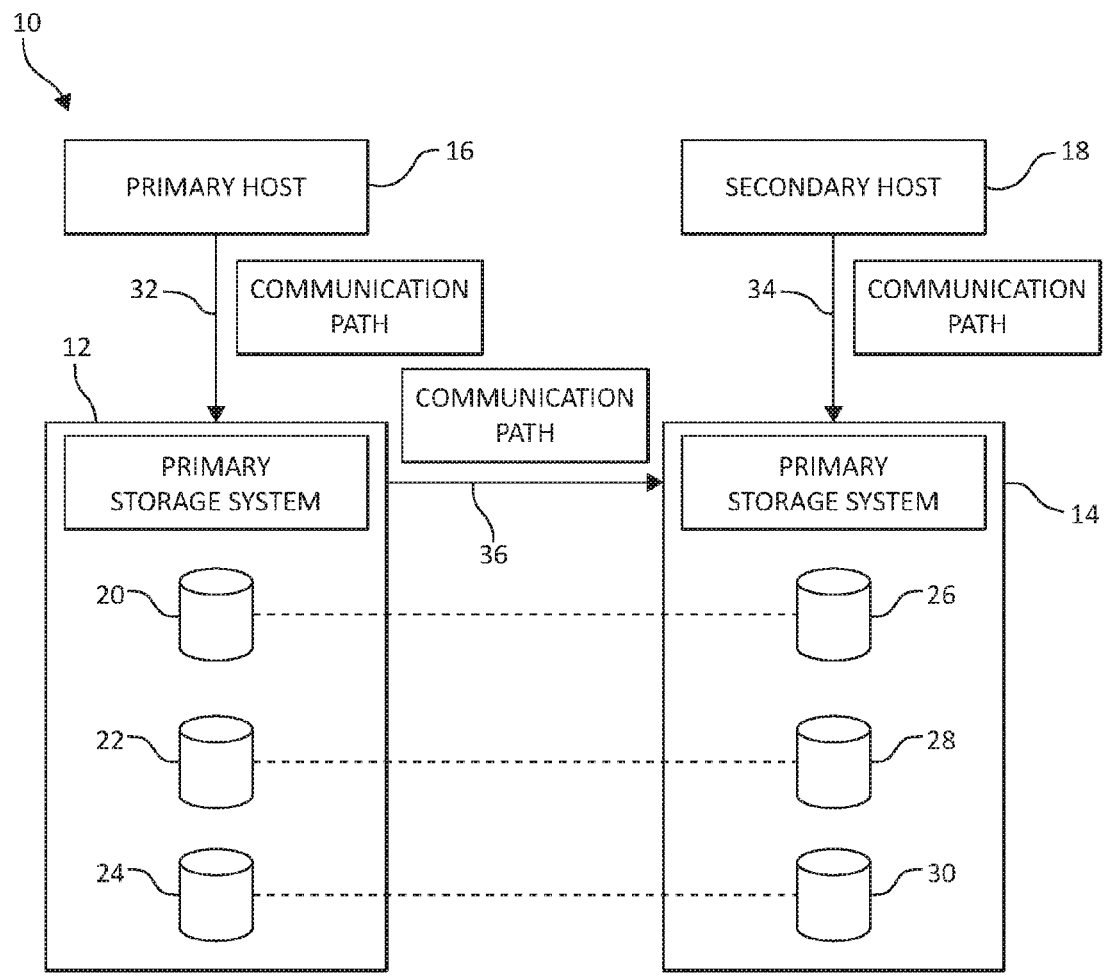
FIG. 1 illustrates is a block diagram showing an exemplary hardware structure for a peer-to-peer remote copy (PPRC) system in which aspects of the present invention may be realized.

With increasingly large amounts of data being handled in data processing systems, storage systems, such as disk storage systems are being used to store data. Some organizations rely heavily on data and quick access to the data. Disasters caused by environmental conditions, user errors, or application errors may occur in which access to the data is lost for some period of time. Mirroring or copying data to a secondary storage system from a primary storage system is currently employed to minimize the time in which access to data is lost due to a disaster. A peer-to-peer remote copy (PPRC) system is a hardware-based disaster recovery solution designed to maintain a mirror image of application data at a remote secondary location. The PPRC system may a synchronous or asynchronous copy mechanism that creates a copy of data at a remote or secondary storage system. This copy, at the secondary storage system, is kept current with the data located at the primary storage system. Particularly, key to PPRC, is the migration of data sets from mass storage devices, such as hard disk drives or other data storage media, to another set with a minimum of disruption to the applications using the data. Particularly, PPRC mechanisms automatically copy changes that are made to a source (primary) volume to a target (secondary) volume until the PPRC relationship is suspended or terminated. In other words, a copy of the data located at the secondary storage system is kept in sync with the data at the primary storage system as observed by the user of the data in a synchronous PPRC relationship, and replicated to. Volume pairs are designated in which a volume in the primary storage system is paired with a volume in the secondary storage system.

With a synchronous PPRC system, a PPRC data copy to the recovery or secondary storage system occurs synchronously from the primary host point of view with write operations to volumes in the primary storage system. In an asynchronous PPRC system, data copy is performed, but not in a synchronous manner. Paths connect the primary storage system to the secondary storage system. When data is written from a primary host to the primary storage system, the data written to a primary volume is also written by the primary storage system to a corresponding volume in the secondary storage system using a path to the secondary storage system.

A track may either be regarded as sequential or random in cache. Depending on whether the track is sequential or random, cache algorithms react differently. For example, if the track is sequential, then clock bits for the tracks are turned off differently as follows. For a host write operation, if the track is sequential, a track may be located whose number is X less than a particular (this) track, as defined by (N−X). In one embodiment, the default for X is 28. If (N−X) track is also sequential and modified, then the temporal bit is set to zero.

Alternatively, if the track is random, clock bits may be turned off during a destage scan operation, for example, as follows. For decrementing clock bits during a destage scan, as a first order of business, destage transfer control blocks (TCBs) parse through the B-tree using a sorted list in the order of the track number as they select tracks for destages. If the temporal bit for a particular track is non-zero, then they may, in one embodiment, reduce the temporal bit as follows. First, the time it took for the previous complete spin of the B-tree is determined. If the track has a non-temporal bit, the destage scan decrements the temporal bit by 1 plus (previous scan time/100 MS (truncated)). The scan never decrements the temporal bit from less than 3 (i.e., less than one write) to zero, if less than three, the temporal bit is decremented to 3 (one write). This allows the second write an extra scan before the track can be destaged.

Consider an additional example. Where a sequential bit is used for a copy source-to-target operation on a source track destage, on the destage of a track during a FlashCopy operation of the source volume, a copy source-to-target may be required. The copy source to target is needed if the track on disk on the source volume is part of the FlashCopy from the source to target volume. When the sequential bit is set on a track under this scheme, a copy source-to-target is performed for a full stride of tracks from source to target; otherwise, the copy source-to-target operation is performed for just one track.

Currently, every track replicated from primary volumes to secondary volumes is sent with the sequential bit set. Accordingly, every track on the secondary volume has an accompanying sequential bit set. A need exists for a mechanism whereby the correct status of the sequential bit on the secondary volume is efficiently determined.

To address this need, the mechanisms of the illustrated embodiments may implement a two-fold approach, for example. First, if the track is determined to remain in cache on the primary volume, then the sequential bit is copied from the track in cache before sending it to the secondary volume. Secondly, if the track is determined not to remain in the cache, the Out-Of-Sync (OOS) bitmap is examined corresponding to the primary volume to determine if the sequential bit needs to be set before transferring an instant track to the secondary volume.

The following terminology associated with aspects of the present invention may be helpful. A "track" may, for example, refer to herein as a storage unit of a certain size. For example, a track may incorporate 17, 4K segments. A "stride" may, for example, refer to herein as a group of tracks for which a particular redundant array of independent disks (RAID) array generates a parity. For example, a 6+P RAID-5 array stride is 24 tracks.

Continuing the foregoing, a Global Mirror function provides an asynchronous copy process. When a host writes to the primary volume, confirmation of I/O completion is received before the write operation has completed for the copy of the secondary volume. Global Mirror is based on IBM® Copy Services functions: so-called Global Copy and FlashCopy. Global Mirror periodically pauses updates of the primary volumes and swaps change recording bitmaps. Global Mirror then uses the previous bitmap to drain updates from the primary volumes to the secondary volumes. After all primary updates have been drained, the secondary volumes are used as the source for a FlashCopy to tertiary volumes at the recovery site. This ensures that the tertiary copy of the volumes has point-in-time consistency.

"CST" may refer to herein as a copy source-to-target operation, a mechanism, for example to copy a source track to all of its targets. Additionally, a "flash copy relation/relationship" may refer to herein as a logical copy of data from a source extent to a target extent. Finally, an OOS bitmap may refer to herein as a bitmap of tracks on, or associated with, the primary volume, that are out of sync from the secondary volume, and need to be transferred to the secondary volume.

Turning to FIG. 1, a block diagram of one embodiment of a system 10 for FIG. 1 for a peer-to-peer remote copy (PPRC) system in which aspects of the present invention may be realized. At least in the illustrated embodiment, peer remote copy (PPRC) system 10 is shown, which takes the form of an asynchronous PPRC system. PPRC system 10 includes a primary storage system 12 and a secondary storage system 14. PPRC system further includes a primary host 16 connected to primary storage system 12 and a secondary host 18 connected to secondary storage system 14. Primary host 16 stores data in primary storage system 12. Data written to primary storage system 12 is copied to secondary storage system 14. The copy process creates a copy of the data from primary storage system 12 into secondary storage system 14. The copy process is a PPRC mechanism. In an asynchronous PPRC system 10, a write made by primary host 16 is considered complete after the data has been written to primary storage AND a non-volatile record of the change (i.e. setting a bit in the OOS bitmap) has been done. Primary and secondary hosts 16 and 18 may take various forms, such as a server on a network, a Web server on the Internet, or a mainframe computer. Primary storage system 12 and secondary storage system 14 are disk systems in these examples.

A communication path 32 connects primary host 16 to primary storage system 12. A communication path 34 connects secondary host 18 to secondary storage system 14. A communication path 36 connects primary storage system 12 with secondary storage system 14. Communication paths 32, 34, and 36 may take various forms, such as, for example, a local area network (LAN), a wide area network (WAN), the Internet, or an intranet. Communication paths 32, 34, and 36 contain various links, such as, for example, fiber optic lines, packet switched communication links, enterprise systems connection (ESCON) fibers, small computer system interface (SCSI) cable, and wireless communication links.

PPRC system 10 is an example of a data processing system in which the present invention may be implemented and not as an architectural limitation to the present invention. For example, primary host 16 and primary storage system 12 may be connected directly while primary storage system 12 and secondary storage system 14 may be connected by a LAN or a WAN. Further, primary storage system 12 and secondary storage system 14 may be connected to each other by a network rather than a direct connection.

Primary storage system 12 includes a set of storage volumes 20, 22, and 24. Secondary storage system 14 includes a set of storage volumes 26, 28, and 30. Secondary storage volumes 26, 28, and 30 correspond to primary storage volumes 20, 22, and 24. The correspondence between the volumes in primary and secondary storage systems 12 and 14 is set up in PPRC pairs, such that a storage volume in primary storage system 12 has a corresponding storage volume in secondary storage system 14. For instance, primary volume 20 is paired with secondary volume 26, primary volume 22 is paired with secondary volume 28, and primary volume 24 is paired with secondary volume 30. These pairs are referred to as established PPRC pairs.

In operation, primary storage system 12 sends data over communication path 36 to secondary storage system 14 each time data is written to a primary storage volume by primary host 16. Secondary storage system 14 then copies the data to the secondary storage volume corresponding to the primary storage volume. For example, if data is written to primary storage volume 20 then the data is copied to the corresponding secondary storage volume 26. Similarly, if data is written to primary storage volume 22 then the data is copied to the corresponding secondary storage volume 28.

Figure 2:
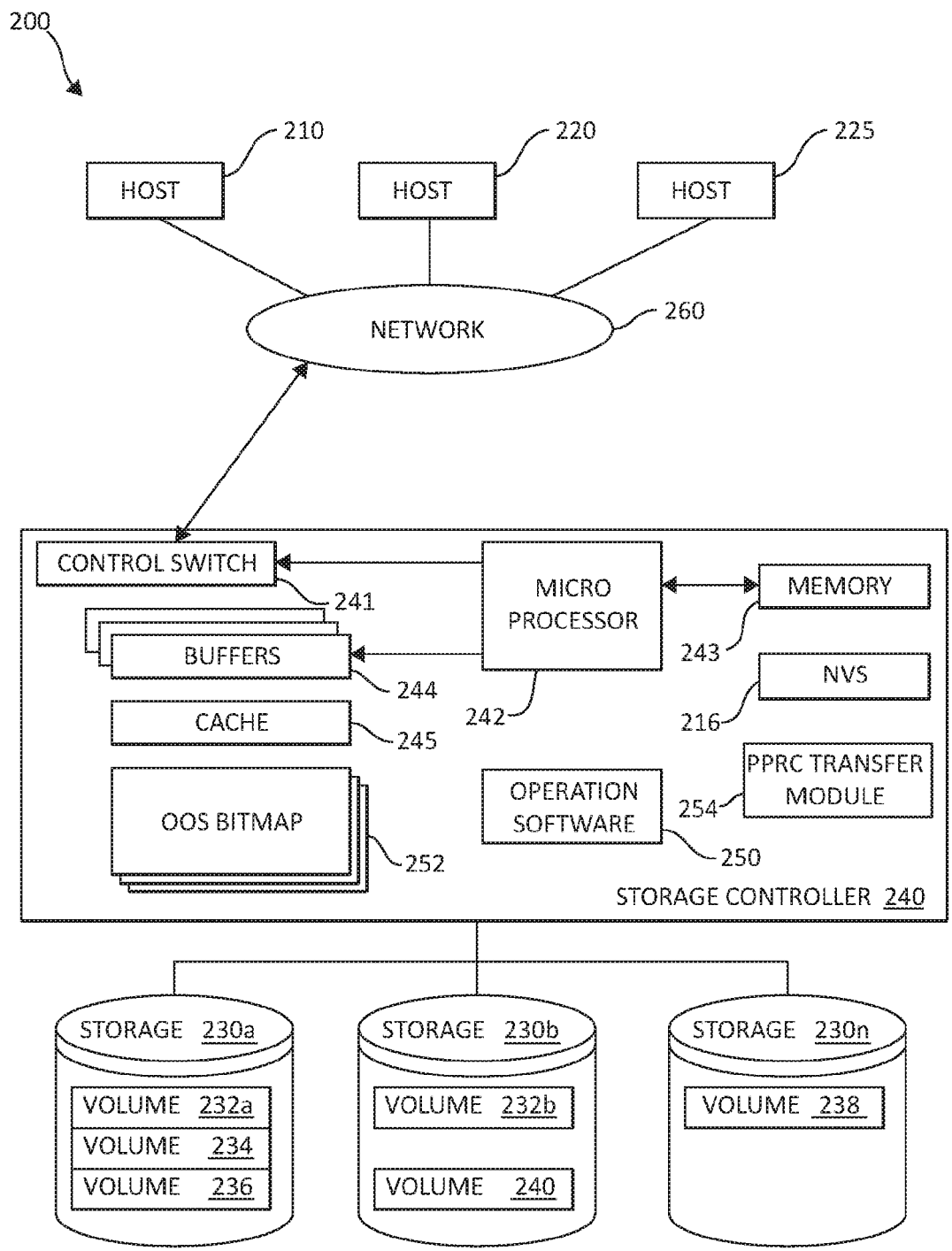
FIG. 2 is a block diagram showing an exemplary hardware structure of a data storage system in a computer system according to the present invention in which aspects of the present invention may be realized.

FIG. 2 is an exemplary block diagram 200 showing a hardware structure of a data storage system in a computer system according to the present invention. Host computers 210, 220, 225, are shown, each acting as a central processing unit for performing data processing as part of a data storage system 200. The hosts (physical or virtual devices), 210, 220, and 225 may be one or more new physical devices or logical devices to accomplish the purposes of the present invention in the data storage system 200. In one embodiment, by way of example only, a data storage system 200 may be implemented as IBM® System Storage™ DS8000™. A Network connection 260 may be a fibre channel fabric, a fibre channel point to point link, a fibre channel over ethernet fabric or point to point link, a FICON or ESCON I/O interface, any other I/O interface type, a wireless network, a wired network, a LAN, a WAN, heterogeneous, homogeneous, public (i.e. the Internet), private, or any combination thereof. The hosts, 210, 220, and 225 may be local or distributed among one or more locations and may be equipped with any type of fabric (or fabric channel) (not shown in FIG. 2) or network adapter 260 to the storage controller 240, such as Fibre channel, FICON, ESCON, Ethernet, fiber optic, wireless, or coaxial adapters. Data storage system 200 is accordingly equipped with a suitable fabric (not shown in FIG. 2) or network adapter 260 to communicate. Data storage system 200 is depicted in FIG. 2 comprising storage controller 240 and storage 230. In one embodiment, the embodiments described herein may be applicable to a variety of types of computing architectures, such as in a virtual cluster management environment using the various embodiments as described herein.

To facilitate a clearer understanding of the methods described herein, storage controller 240 is shown in FIG. 2 as a single processing unit, including a microprocessor 242, system memory 243 and nonvolatile storage ("NVS") 216, which will be described in more detail below. It is noted that in some embodiments, storage controller 240 is comprised of multiple processing units, each with their own processor complex and system memory, and interconnected by a dedicated network within data storage system 200. Storage 230 may be comprised of one or more storage devices, such as storage arrays, which are connected to storage controller 240 by a storage network.

In some embodiments, the devices included in storage 230 may be connected in a loop architecture. Storage controller 240 manages storage 230 and facilitates the processing of write and read requests intended for storage 230. The system memory 243 of storage controller 240 stores the operation software 250, program instructions and data, which the processor 242 may access for executing functions and method steps associated with managing storage 230, and executing the steps and methods of the present invention. As shown in FIG. 2, system memory 243 may also include or be in communication with a cache 245 for storage 230, also referred to herein as a "cache memory", for buffering "write data" and "read data", which respectively refer to write/read requests and their associated data. In one embodiment, cache 245 is allocated in a device external to system memory 243, yet remains accessible by microprocessor 242 and may serve to provide additional security against data loss, in addition to carrying out the operations as described herein.

In some embodiments, cache 245 is implemented with a volatile memory and non-volatile memory and coupled to microprocessor 242 via a local bus (not shown in FIG. 2) for enhanced performance of data storage system 200. The NVS 216 included in data storage controller is accessible by microprocessor 242 and serves to provide additional support for operations and execution of the present invention as described in other figures. The NVS 216, may also referred to as a "persistent" cache, or "cache memory" and is implemented with nonvolatile memory that may or may not utilize external power to retain data stored therein. The NVS may be stored in and with the cache 245 for any purposes suited to accomplish the objectives of the present invention. In some embodiments, a backup power source (not shown in FIG. 2), such as a battery, supplies NVS 216 with sufficient power to retain the data stored therein in case of power loss to data storage system 200. In certain embodiments, the capacity of NVS 216 is less than or equal to the total capacity of cache 245.

Storage 230 may be physically comprised of one or more storage devices, such as storage arrays. A storage array is a logical grouping of individual storage devices, such as a hard disk. In certain embodiments, storage 230 is comprised of a JBOD (Just a Bunch of Disks) array or a RAID (Redundant Array of Independent Disks) array. A collection of physical storage arrays may be further combined to form a rank, which dissociates the physical storage from the logical configuration. The storage space in a rank may be allocated into logical volumes, which define the storage location specified in a write/read request.

In one embodiment, the storage system as shown in FIG. 2 may include a logical volume, or simply "volume," may have different kinds of allocations. Storage 230a, 230b and 230n are shown as ranks in data storage system 200, and are referred to herein as rank 230a, 230b and 230n. Ranks may be local to data storage system 200, or may be located at a physically remote location. In other words, a local storage controller may connect with a remote storage controller and manage storage at the remote location. Rank 230a is shown configured with two entire volumes, 234 and 236, as well as one partial volume 232a. Rank 230b is shown with another partial volume 232b. Thus volume 232 is allocated across ranks 230a and 230b. Rank 230n is shown as being fully allocated to volume 238—that is, rank 230n refers to the entire physical storage for volume 238. From the above examples, it will be appreciated that a rank may be configured to include one or more partial and/or entire volumes. Volumes and ranks may further be divided into so-called "tracks," which represent a fixed block of storage. A track is therefore associated with a given volume and may be given a given rank.

The storage controller 240 may include an OOS bitmap(s) 252 that are associated with one or more storage volumes 230. Additionally, the storage controller 240 may include a PPRC transfer module 254. OOS bitmap 252 and PPRC transfer module 254 may be one complete module functioning simultaneously or separate modules. The PPRC transfer module 254 may have some internal memory (not shown) and may store unprocessed, processed, or "semi-processed" data. In addition, the PPRC transfer module 254 and OOS bitmap 252 may work in conjunction with each and every component of the storage controller 240, the hosts 210, 220, 225, and other storage controllers 240 and hosts 210, 220, and 225 that may be remotely connected via the storage fabric 260. The PPRC transfer module 254 OOS bitmap 252 may also be located in the cache 245 or other components of the storage controller 240 at any one time.

PPRC transfer module 254 and OOS bitmap 252 may, in one embodiment, implement various mechanisms as will be further described to effect aspects of the present invention. For example, the OOS bitmap may be consulted as previously described to determine the applicable status of a particular sequential bit. In addition, for example, the PPRC transfer module 252 may determine if the applicable sequential bit exists in primary cache 245, and copy the sequential bit from the primary cache 245. As one of ordinary skill in the art will appreciate, the destage module 254, PPRC transfer module 252, or another component may be utilized to perform various aspects of the illustrated embodiments as will be further described.

The storage controller 240 includes a control switch 241 for controlling the fiber channel protocol to the host computers 210, 220, 225, a microprocessor 242 for controlling all the storage controller 240, a nonvolatile control memory 243 for storing a microprogram (operation software) 250 for controlling the operation of storage controller 240, cache 245 for temporarily storing (buffering) data, and buffers 244 for assisting the cache 245 to read and write data, a control switch 241 for controlling a protocol to control data transfer to or from the free space management module 255, the PPRC transfer module 257, the PPRC modified sectors bitmap module 259, the asynchronous cleanup module 261, the list(s) module 263, the bind segments/slot(s) module 265, the counter module 267, and the hash table module 269 in which information may be set. Multiple buffers 244 may be implemented to assist with the methods and steps as described herein.

In one embodiment, the host computers or one or more physical or virtual devices, 210, 220, 225 and the storage controller 240 are connected through a network adaptor (this could be a fibre channel) 260 as an interface i.e., via a switch called "fabric." The microprocessor 242 may control the memory 243 to store command information from the cluster host/node device (physical or virtual) 210 and information for identifying the cluster host/node device (physical or virtual) 210. The control switch 241, the buffers 244, the cache 245, the operating software 250, the microprocessor 242, memory 243, NVS 216, the free space management module 255, the PPRC transfer module 257, the PPRC modified sectors bitmap module 259, the asynchronous cleanup module 261, the list(s) module 263, the bind segments/slot(s) module 265, the counter module 267, and the hash table module 269 are in communication with each other and may be separate or one individual component(s). Also, several, if not all of the components, such as the operation software 250 may be included with the memory 243. Each of the components within the devices shown may be linked together and may be in communication with each other for purposes suited to the present invention.

Figure 3:
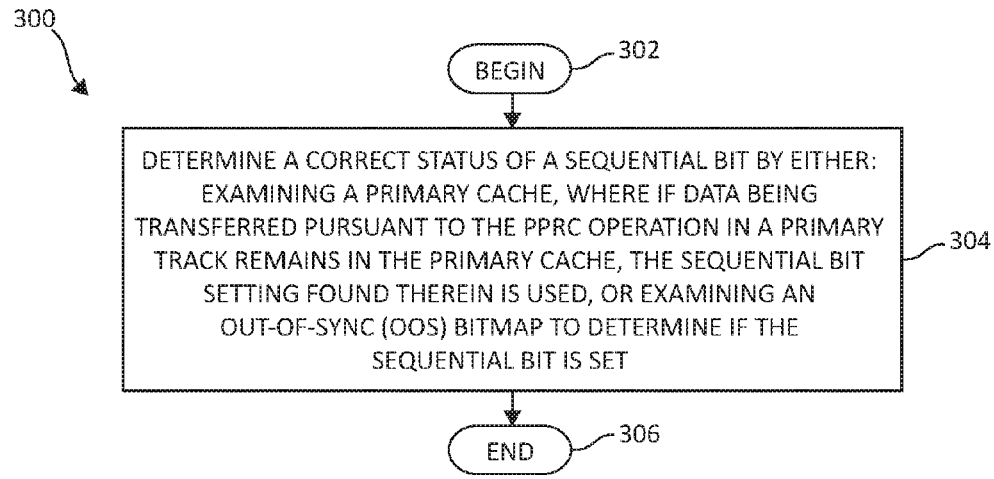
FIG. 3 is a flowchart diagram illustrating an exemplary method for performing efficient management of tracks in an asynchronous Peer-to-Peer Redundant Copy (PPRC) operation, in which aspects of the present invention may be realized.

Turning to FIG. 3, a flowchart diagram illustrating an exemplary method 300 for performing efficient management of sequentiality of tracks for an asynchronous PPRC operation in a computing storage environment, is depicted. Method 300 begins (step 302) with a determination of a correct status of a sequential bit by either examining a primary cache, where if data being transferred pursuant to the PPRC operation in a primary track remains in the primary cache, the sequential bit setting found therein is utilized, or alternatively, by examining an OOS bitmap to determine if the sequential bit is set (step 304). The method then ends (step 306).

Method 300 as described may be more particularly illustrated by the following functionality that may be performed pursuant to one of the illustrated embodiments. As a first step (from the perspective of the primary volume), if the particular track in question exists in the primary cache, the sequential bit is copied from the primary cache into a transfer control block for the secondary track (CDB), otherwise, if the track does not exist in cache, then the OOS bitmap is consulted. If the next N bits in the OOS are set, then the sequential bit is set in the CDB; otherwise, the sequential bit is not set in the CDB.

Furthermore, from the perspective of the secondary volume, the sequential bit in question is copied from the CDB into the secondary track transfer control block. If the sequential bit is set in the CDB, then the track in the secondary cache whose number is X less than this particular track is located (N−X). In one embodiment, the default for X is 28. Finally, if the (N−X) track is also sequential and has been modified, the corresponding temporal bit is set to zero.

Figure 4:
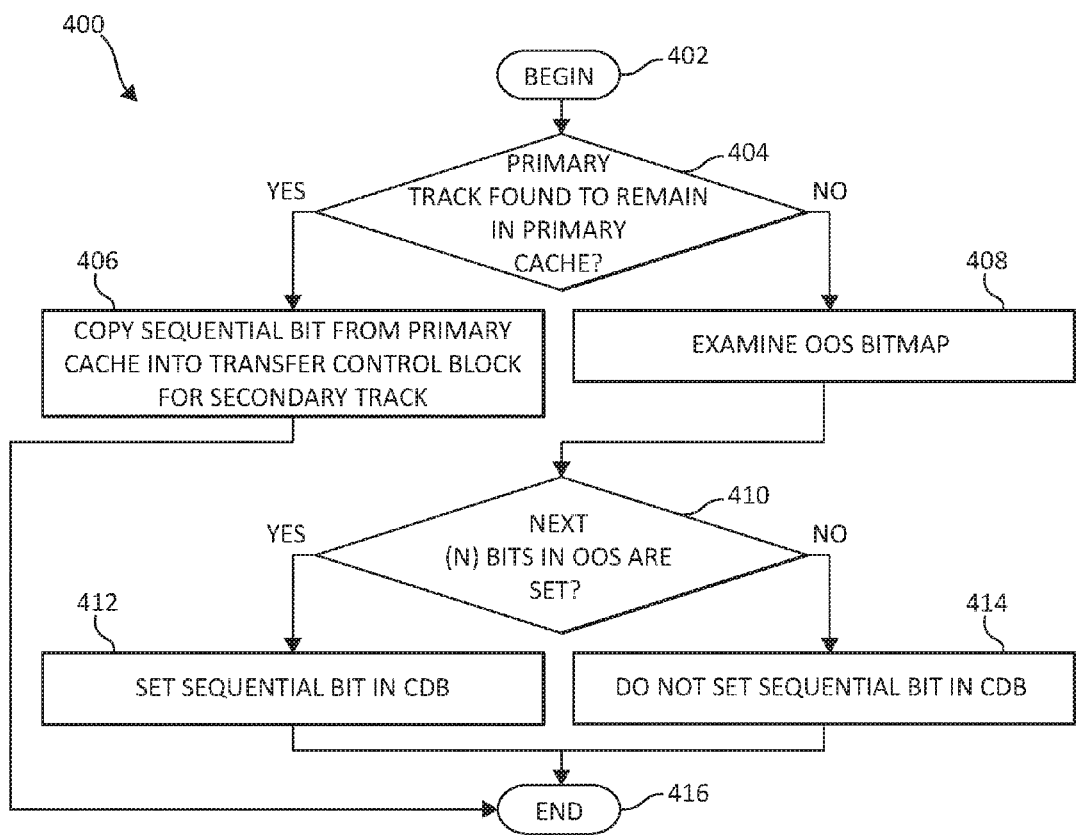
FIG. 4 is a flowchart diagram showing an additional exemplary method for performing efficient management of tracks in an asynchronous PPRC operation, from the perspective of the primary volume, here again in which aspects of the present invention may be realized.
Figure 5:
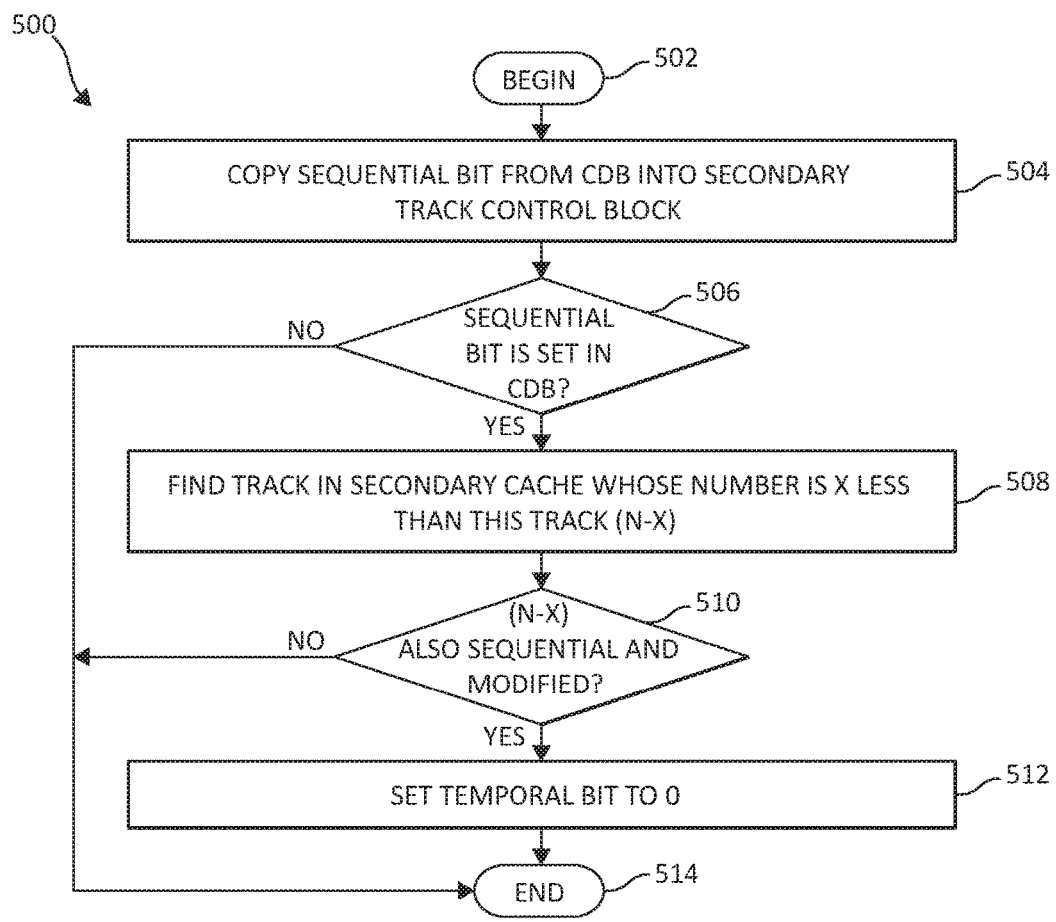
FIG. 5 is a flowchart diagram showing an additional exemplary method for performing efficient management of tracks in an asynchronous PPRC operation, from the perspective of the secondary volume, here again in which aspects of the present invention may be realized.

Turning now to FIG. 4, an exemplary method 400 for performing efficient sequentiality management in view of the previous discussion is described from the perspective of the primary volume. Method 400 begins (step 402) by determining if the track in question is found to remain in the primary cache (step 404). If so, the sequential bit is copied from the primary cache into a transfer control block for the secondary track (step 406), and the method 400 ends (step 402).

As will be appreciated by one skilled in the art, aspects of the present invention may be embodied as a system, method or computer program product. Accordingly, the present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, fieldprogrammable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A method for performing efficient management of tracks in an asynchronous Peer-to-Peer Redundant Copy (PPRC) operation in a computing storage environment by a processor device, comprising:
  determining a correct status of a sequential bit by:
    examining a primary cache, wherein if data being transferred pursuant to the PPRC operation in a primary track remains in the primary cache, using the sequential bit setting found therein, and
    examining an Out-Of-Sync (OOS) bitmap to determine if the sequential bit is set; and
  copying the sequential bit from the primary cache to a secondary storage device.

2. The method of claim 1, further including, if the primary track is found to remain in the primary cache, copying the sequential bit from the primary cache into a transfer control block for a secondary track.

3. The method of claim 1, wherein examining the OOS bitmap to determine if the sequential bit is set further includes determining if the bit is set in the OOS bitmap, and setting the sequential bit in the data being transferred pursuant to the PPRC operation.

4. The method of claim 3, wherein examining the OOS bitmap further includes examining a predetermined subsequent number of bits, further wherein if the predetermined subsequent number of bits are set, then setting the sequential bit in the transfer control block for a secondary track.

5. The method of claim 1, further including, if the sequential bit is set in a transfer control block, locating a secondary track in the secondary cache having a value N of a value X less than the secondary track as defined by (N−X).

6. The method of claim 5, wherein if the (N−X) secondary track is also sequential and modified pursuant to the PPRC operation, setting a corresponding temporal bit to zero.

7. A system for performing efficient full-stride copy source-to-target operations in a computing storage environment, the system comprising:
    at least one processor device operable in the computing environment, wherein the at least one processor device:
    determines a correct status of a sequential bit by:
        examining a primary cache, wherein if data being transferred pursuant to the PPRC operation in a primary track remains in the primary cache, using the sequential bit setting found therein, and
        examining an Out-Of-Sync (OOS) bitmap to determine if the sequential bit is set; and
    copies the sequential bit from the primary cache to a secondary storage device.

8. The system of claim 7, wherein the at least one processor device, if the primary track is found to remain in the primary cache, copies the sequential bit from the primary cache into a transfer control block for a secondary track.

9. The system of claim 7, wherein the at least one processor device, pursuant to examining the OOS bitmap to determine if the sequential bit is set, determines if the bit is set in the OOS bitmap, and sets the sequential bit in the data being transferred pursuant to the PPRC operation.

10. The system of claim 9, wherein the at least one processor device, pursuant to examining the OOS bitmap, examines a predetermined subsequent number of bits, further wherein if the predetermined subsequent number of bits are set, then sets the sequential bit in the transfer control block for a secondary track.

11. The system of claim 7, wherein the at least one processor device, if the sequential bit is set in a transfer control block, locates a secondary track in the secondary cache having a value N of a value X less than the secondary track as defined by (N−X).

12. The system of claim 11, wherein the at least one processor device, if the (N−X) secondary track is also sequential and modified pursuant to the PPRC operation, sets a corresponding temporal bit to zero.

13. A computer program product for performing efficient management of tracks in an asynchronous Peer-to-Peer Redundant Copy (PPRC) operation in a computing storage environment by a processor device, the computer program product comprising a non-transitory computer-readable storage medium having computer-readable program code portions stored therein, the computer-readable program code portions comprising:
    an executable portion that determines a correct status of a sequential bit by:
        examining a primary cache, wherein if data being transferred pursuant to the PPRC operation in a primary track remains in the primary cache, using the sequential bit setting found therein, and
        examining an Out-Of-Sync (OOS) bitmap to determine if the sequential bit is set; and
    an executable portion that copies the sequential bit from the primary cache to a secondary storage device.

14. The computer program product of claim 13, further including an executable portion that, if the primary track is found to remain in the primary cache, copies the sequential bit from the primary cache into a transfer control block for a secondary track.

15. The computer program product of claim 13, further including an executable portion that, pursuant to examining the OOS bitmap to determine if the sequential bit is set, determines if the bit is set in the OOS bitmap, and sets the sequential bit in the data being transferred pursuant to the PPRC operation.

16. The computer program product of claim 15, further including an executable portion that, pursuant to examining the OOS bitmap, examines a predetermined subsequent number of bits, further wherein if the predetermined subsequent number of bits are set, then sets the sequential bit in the transfer control block for a secondary track.

17. The computer program product of claim 13, further including an executable portion that, if the sequential bit is set in a transfer control block, locates a secondary track in the secondary cache having a value N of a value X less than the secondary track as defined by (N−X).

18. The computer program product of claim 17, further including an executable portion that, if the (N−X) secondary track is also sequential and modified pursuant to the PPRC operation, sets a corresponding temporal bit to zero.

* * * * *